United States Patent [19]

Stembridge et al.

[11] 4,347,591
[45] Aug. 31, 1982

[54] IMAGING SONAR SYSTEM AND METHOD

[76] Inventors: William F. Stembridge, 3541 Prince George, East Point, Ga. 30044; Roger P. Woodward, 2652 Fleur de Lis Pl., Atlanta, Ga. 30040; Larry H. Glassman, 5994 Benton Woods Dr. NE., Atlanta, Ga. 30042

[21] Appl. No.: 201,909

[22] Filed: Oct. 29, 1980

Related U.S. Application Data

[63] Continuation of Ser. No. 581,037, May 27, 1975, abandoned, Ser. No. 800,803, May 26, 1977, abandoned, and Ser. No. 74,862, Sep. 12, 1979, abandoned.

[51] Int. Cl.$^3$ .............................................. G01S 15/96
[52] U.S. Cl. ..................................... 367/104; 367/11; 367/113
[58] Field of Search ................... 367/11, 103, 104, 113

[56] References Cited

U.S. PATENT DOCUMENTS

| | | | |
|---|---|---|---|
| 2,418,846 | 4/1947 | Meacham | 367/104 |
| 3,723,953 | 3/1973 | Scheer | 367/104 |
| 3,790,925 | 2/1974 | Ahrens | 367/113 |
| 3,921,122 | 11/1975 | Christoff | 367/11 |

Primary Examiner—Richard A. Farley
Attorney, Agent, or Firm—Newton, Hopkins & Ormsby

[57] ABSTRACT

An imaging sonar system is disclosed comprising a transmitter, a receiver, and a rotatable transducer coupled with the transmitter and receiver for generating sound waves and for detecting echoes therefrom. Drive means are provided for rotating the rotatable transducer. Transducer position sensing means are provided for sensing the rotary position of the transducer. Analog to digital converter means are coupled with the receiver for converting receiver emitted signals into digital form. Serial access memory means are provided entering into storage receiver emitted signal data in digital form at a preselected rate and for withdrawing from storage receiver emitted signal data at a rate different than the predetermined rate. Write and read control means are also provided for respectively entering digital data into and recalling digital data from the memory. A cathode ray tube is coupled with the memory having beam deflector means synchronized with the memory read control means for displaying data recalled from the memory means as an image of echoes detected by the transducer. Transmit command logic means are coupled with the memory write control means and with the transducer position sensing means for initiating transmit commands to the transmitter with the memory write control means synchronized with sensed transducer positions.

34 Claims, 10 Drawing Figures

| SHIFT REGISTER POSITION | CLOCK CYCLE NO. | ELEMENT ACCESSED |
|---|---|---|
| $A_1$ \| $A_2$ \| $A_3$ \| $A_4$ ← READ DATA HERE | 1 | $A_4$ |
| $A_2$ \| $A_3$ \| $A_4$ \| $A_1$ | 4 | $A_1$ |
| $A_3$ \| $A_4$ \| $A_1$ \| $A_2$ | 7 | $A_2$ |
| $A_4$ \| $A_1$ \| $A_2$ \| $A_3$ | 10 | $A_3$ |
| $A_1$ \| $A_2$ \| $A_3$ \| $A_4$ | 13 | (REPEAT) |

FIG 6

| SHIFT REGISTER POSITION | CLOCK CYCLE NO. | ELEMENT ACCESSED |
|---|---|---|
| $A_1$ \| $A_2$ \| $A_3$ \| $A_4$ ← READ DATA HERE | 1 | $A_4$ |
| $A_3$ \| $A_4$ \| $A_1$ \| $A_2$ | 3 | $A_2$ |
| $A_1$ \| $A_2$ \| $A_3$ \| $A_4$ | 5 | $A_4$ |
| $A_3$ \| $A_4$ \| $A_1$ \| $A_2$ | 7 | $A_2$ |
| $A_1$ \| $A_2$ \| $A_3$ \| $A_4$ | 9 | (REPEAT) |

FIG 7

IMAGING SONAR SYSTEM AND METHOD

This is a continuation, of application Ser. Nos. 581,037, 800,803 and 74,862 filed 5/27/75; 5/26/77 and 9/12/79 all of which are abandoned.

BACKGROUND OF THE INVENTION

This invention relates to imaging sonar systems of the type used on boats and ships in detecting and displaying underwater targets as the bottom and the shore, and mobile objects such as fishes.

Heretofore, imaging sonar systems have employed transducer means for generating sound waves and for detecting echoes therefrom. Typically, the transducer is continuously rotated so that the body of water about the system is scanned omnidirectionally. Detected echoes are fed as an analog video signal to a cathode ray tube where they are displayed along a rotating sweep line synchronized with the rotating transducer. Through usage of long persistence phosphor the image displayed on the tube trails the sweep line a sufficient length of time to enable the operator to mentally visualize a sizable portion of the area under surveillance at any one time.

The just described imaging sonar systems of the prior art have met with only limited commercial success due to a number of performance limitations. A principal problem found by operators using such imaging sonar systems has been the degree of difficulty in interpreting the displayed image. Due to the relatively slow velocity of sound in water the transducer must rotate at a relatively slow rate. As a result, the sweep on the cathode ray tube accompanying rotation of the transducer is itself slow. Thus, even with the use of long persistence phosphorous tubes, the majority of the display is still blank at any one moment. The operator therefore is forced continuously to remember images previously presented in order to form a mental picture of the entire area being surveyed. With a boat moving over the bottom and with fishes themselves swimming therebeneath, this places substantial mental stress upon the operator.

In addition to the just mentioned limitation of imaging sonar systems of the prior art, discrimination between echo signal strengths has also been exceedingly difficult to obtain since the signal received by the cathode ray tube is analog. For example, weed-covered and muddy bottoms appear as a relatively weak echo return. To insure that the bottom is presented to the operator, it is necessary to have even its weak signals energize the tube phosphor. Thus, when relatively strong echoes, such as those caused by rocks, appear, they have a strength of return several magnitudes of order greater than that of a muddy bottom. As a result, a host of returns falls into the category of maximum phosphorous illuminescence rendering indiscriminate patterns of echo return on the display tube. The absolute intensity of long persistence phosphor is also relatively low requiring the tube to be light shielded or placed in a darkened room which further lessens its attractiveness to small boat users such as fishermen.

In addition to operational deficiencies, prior art imaging sonar systems have been technically complex and expensive to manufacture. Cathode ray tubes of the type that employ relatively long persistence phosphor are quite costly. High azimuth resolution has been required in view of the above mentioned difficulties in target discrimination. In order to completely scan the body of water beneath a boat it has been necessary not only to have scan horizontally in azimuth but also in elevation. This in turn increased the complexity and cost of prior systems. Furthermore, it has been necessary to synchronize the movement of the transducer in the water with the sweep of the cathode ray tube. This is inherently difficult to accomplish with simplicity due to the many mechanical forces to which a transducer submerged in water beneath a moving boat is subjected. To exclude extraneous electric noises, such as those of spark plugs of the boat motor, the prior art devices have also had to use mechanically tuned filters which themselves present added cost. A further disadvantage has been the incapacity of the prior art systems to recall prior images.

Accordingly, it is a general object of the present invention to provide an improved imaging sonar system.

Another general object of the invention is to provide an improved method of forming visual images of submerged scenes.

More specifically, it is an object of the present invention to provide an imaging sonar system having improved image display capacity.

Another object of the invention is to provide an imaging sonar system utilizing a cathode ray tube of the type employing short persistence, high intensity phosphors.

Another object of the invention is to provide an imaging sonar system and method by which a complete and substantial current image of an area being scanned may be continuously presented for observation.

Another object of the invention is to provide an imaging sonar system capable of displaying echo returns with improved target strength discrimination.

Another object of the invention is to provide an imaging sonar system employing a fixed elevation angle transducer.

Another object of the invention is to provide an imaging sonar system which does not require synchronization between transducer position and cathode ray tube display sweep.

Another object of the invention is to provide an imaging sonar system with long term image storage means for recalling previously displayed images.

Another object of the invention is to provide an imaging sonar system capable of displaying images on a cathode ray tube without substantial fading of images.

Yet another object of the invention is to provide an imaging sonar system with improved means for rejecting external noise and for synchronizing operating frequencies of the transmitter and receiver.

Still another object of the invention is to provide an imaging sonar system of the type described which is of relatively simple, reliable and economic construction.

Still yet another object of the invention is to provide a method of forming visual images of submerged scenes by which data in the form of sound wave echoes is received at a substantially slower rate than that by which data is presented in digited electrical form to a cathode ray tube for display.

SUMMARY OF THE INVENTION

In one form of the invention an imaging sonar system is provided comprising a transmitter, a receiver, and rotatable transducer means coupled with the transmitter and receiver for generating sound waves and for detecting echoes therefrom. Drive means are provided for rotating the roatatable transducer means and transducer position sensing means provided for sensing the rotary position ot the rotatable transducer means. Analog to digital converter means are coupled with the receiver for converting receiver emitted signals into digital form. Digital memory means are provided for storing the receiver emitted signals as digital data. Write and read control means are also provided for respectively entering digital data into and recalling digital data from the memory means. A cathode ray tube is coupled with the memory means which tube has beam deflector means synchronized with the memory read control means for displaying data recalled from the memory means as an image of echoes detected by the transducer means. Transmit command logic means are coupled with the memory write control means and with the transducer position sensing means for initiating transmit commands to the transmitter with the memory write control means synchronized with sensed transducer positions.

In another form of the invention an imaging sonar system is provided comprising a transmitter, a receiver, and transducer means coupled with the transmitter and receiver for generating sound waves and for detecting echoes therefrom. Analog to digital converter means are coupled with the receiver for converting receiver emitted signals into digital form. Serial access memory means are provided for accepting into storage receiver emitted signal data at a pretermined rate and for presenting for recall from storage receiver emitted signal data at a rate different from the predetermined rate. Write and read control means are further provided for respectively entering digital data into and recalling digital data from the serial access memory means. A cathode ray tube is coupled with the memory means having beam deflector means synchronized with the memory read control means for displaying data recalled from the memory means as an image of echoes detected by the transducer means.

In yet another form of the invention a method is provided for forming visual images of submerged scenes. In practicing the method sound waves are propogated onto a submerged scene and echoes are detected therefrom. The detected sound wave echoes transformed into an analog electrical energy signal which is then digitized. Digital data from the digitized signal is then entered into a digital memory at a first rate. Digital data is then recalled from the memory at a second rate faster than the first rate and displayed on a cathode ray tube.

DETAILED DESCRIPTION OF THE DRAWING

Figure 1:
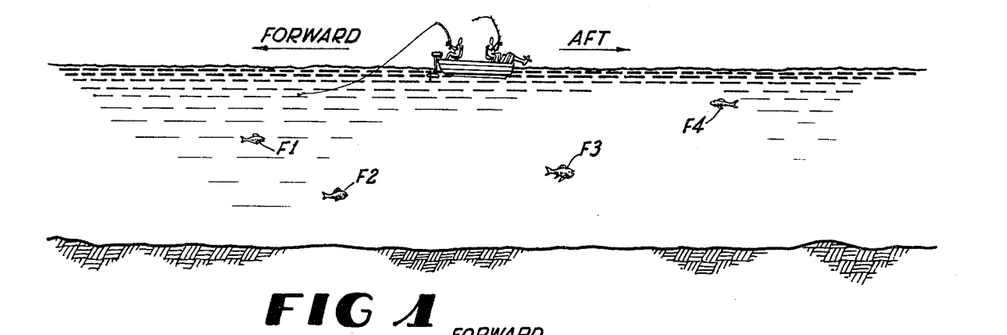
FIG. 1 is a pictoral illustration of a fishing boat utilizing an imaging sonar system in accordance with the present invention in scanning a body of water therebeneath.
Figure 2:
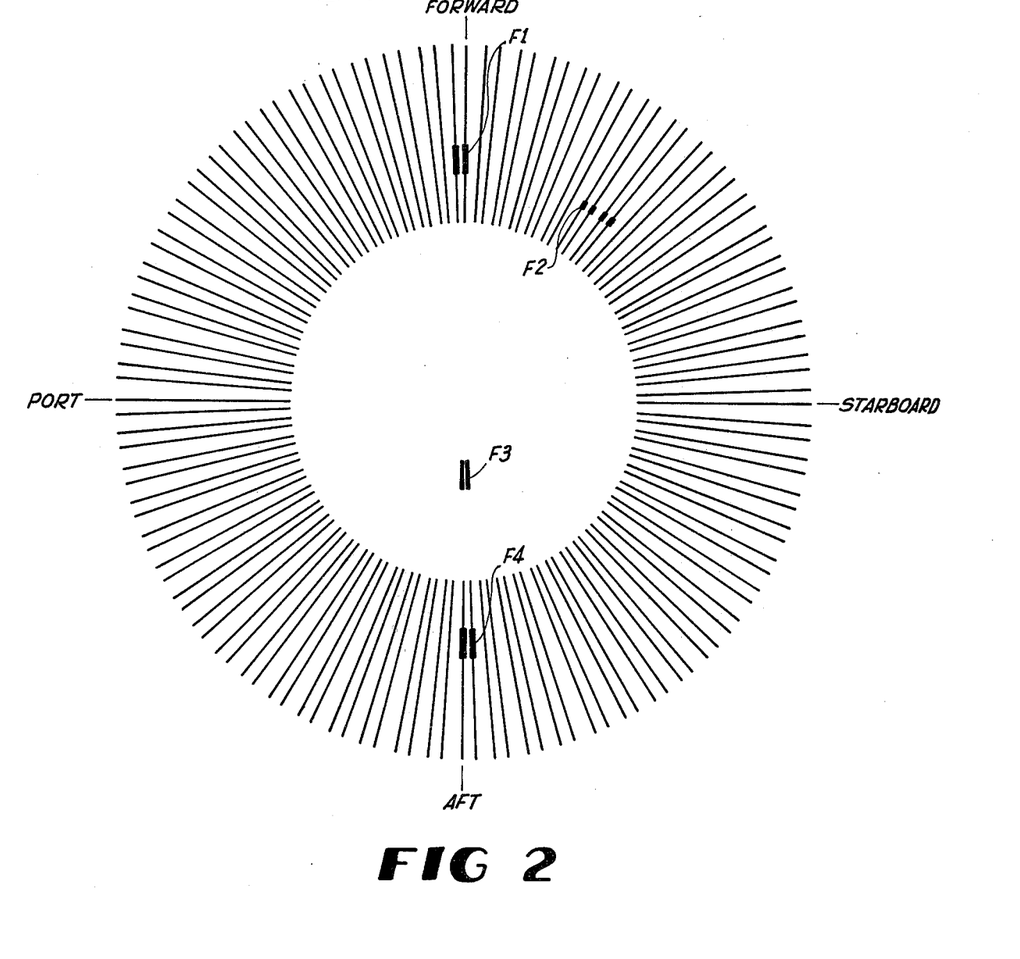
FIG. 2 is a plan view of the image simultaneously displayed by a system of the present invention of the scene shown pictorally in FIG. 1.

With reference now to FIGS. 1 and 2 of the drawing, an imaging sonar system embodying principles of the present invention may be seen in operation scanning a body of water beneath a fishing boat. The antenna pattern of the system is such as to produce sound waves of relatively narrow azimuth beam width, such as some 6°, but of relatively wide beam width in elevation, such as almost 90°. The antenna pattern produced by the system transducer slowly rotates about a vertical axis so as to scan in a complete circle about the boat although a scan of less than 360° may of course be used, if desired. In utilizing the system the operator therefore imagines himself positioned in the center of the display screen provided by the system cathode ray tube. As shown in FIG. 2, forward of the boat is up on the screen and aft is down while starboard and port appear on the screen as they do from the boat. Target distance or range from the boat is represented as distance from the center of the display screen. In this manner the display geometry or coordinated system is quite similar to that of plan position indicator type radar systems. With this type of presentation the operator may discern both direction in azimuth to echo targets as well as distance but not elevation. Echo targets appear conventionally as bright spots or blips on the scope while the absence of targets appears as dark areas although such is reversed in FIG. 2 for pictoral clarity.

As a specific example of an image detected by the sonar system reference may again be had to FIG. 1 where a boat is seen to be positioned atop the surface of a body of water flooding a planar muddy bottom. The system is set with a 300 foot range, for exemplary purposes, within which is seen to be four fishes, F1, F2, F3 and F4. For simplicity of illustration three fishes F1, F3 and F4 are located on a vertical plane passing directly fore and aft of the boat with only one fish F2 to one side thereof. The image of these various targets formed on the system display tube is illustrated in FIG. 2 where it will be noted that no target appears within the first 150 foot range of the boat except for fish F3 located some 75 feet aft of the boat. At the 150 foot range however the bottom of the body of water is shown as a target which target persists out to the full 300 foot range of the system. As the bottom is muddy and does not give relatively strong echoes, the bottom returns are here illustrated as being of relatively weak intensity. Fish F1 is seen to be at a distance greater than 150 feet and therefore appears in the bottom return ahead of the boat as a relatively bright spot with relation to the bottom. A relatively large fish F4 behind the boat is also seen engulfed in the ground return but is nevertheless readily distinguishable by its relatively strong return in relation to that of the bottom. Fish F2 is seen ahead and to starboard of the boat at a range in excess of 150 feet. It will be noticed that the fishes are at different depths in actuality, a fact not discernable on the system display.

Figures 3, 4:
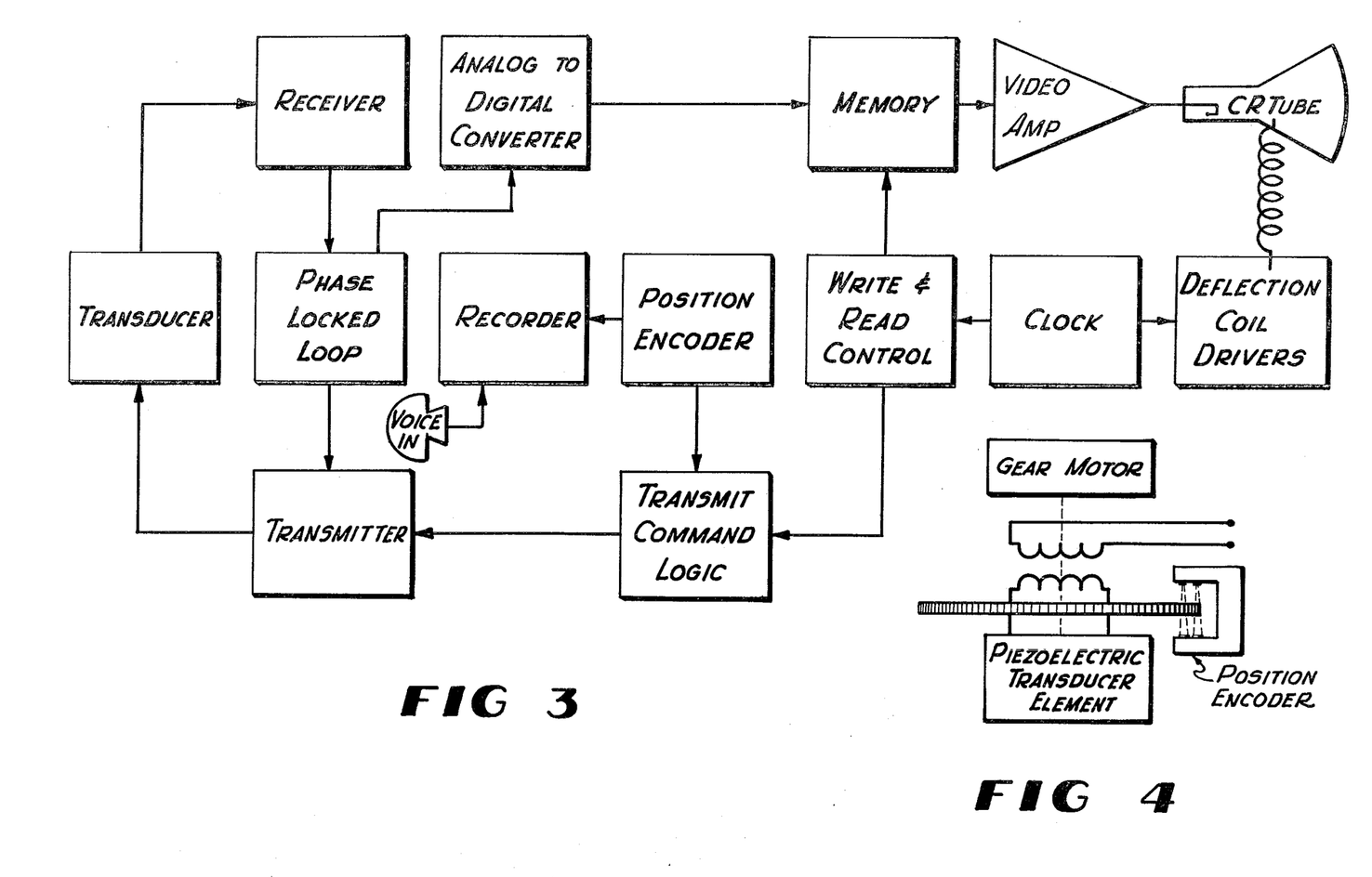
FIG. 3 is a block diagram of an imaging sonar system embodying principles of the present invention in a preferred form.
FIG. 4 is a schematic illustration of the transducer component of the block diagram of the system shown in FIG. 3.

With reference next to FIG. 3, an imaging sonar system embodying principles of the invention in a preferred form is seen generally to comprise a transducer coupled with a receiver and a transmitter. The transmitter is controlled by transmit command logic that is coupled both with a transducer position encoder and a memory write and read control. The receiver is coupled with the transmitter by means of a phase locked loop and to a memory through the loop and an analog to digital converter. The memory output is connected to the video input of a cathode ray tube through a video signal amplifier. The cathode ray tube beam deflection coils are coupled with deflection coil drivers timed by a system clock as is the memory write and read control. The transducer position encoder is also seen to be coupled with a long term recorder such as a conventional tape recorder to which a microphone may also be connected.

With reference next to FIG. 4 the transducer may be seen to include a piezoelectric transducer element such as that sold by Linden Laboratories of State College, Pa. of one inch by two inches size and of 200 kilohertz thickness. The transducer element is oriented downwardly at approximately 45° to the horizon and physically shaped so as to obtain the previously described sound wave transmission pattern having high resolution in azimuth and low resolution in elevation. Upon energization the element serves both to transmit and to receive sound waves. The pizzoelectric element is rotated by means of a gear motor the shaft of which passes through the center of a rotating ferrite core transformer which electrically couples the rotatable transducer element with stationary input and output lines. The use of a rotating ferrite core transformer eliminates the need for slip rings or brush type electrical contacts that would otherwise be required to couple moving electrical components with stationary components. Alternatively, a phased array type transducer could be employed to eliminate mechanical driven rotary scanning. As the elevation angle of the transducer remains fixed during rotation there is no need for mechanical or electrical scanning means or associated signal processing circuitry. The system position encoder is physically associated with the rotatable transducer element as is hereinafter described.

Figure 5A:
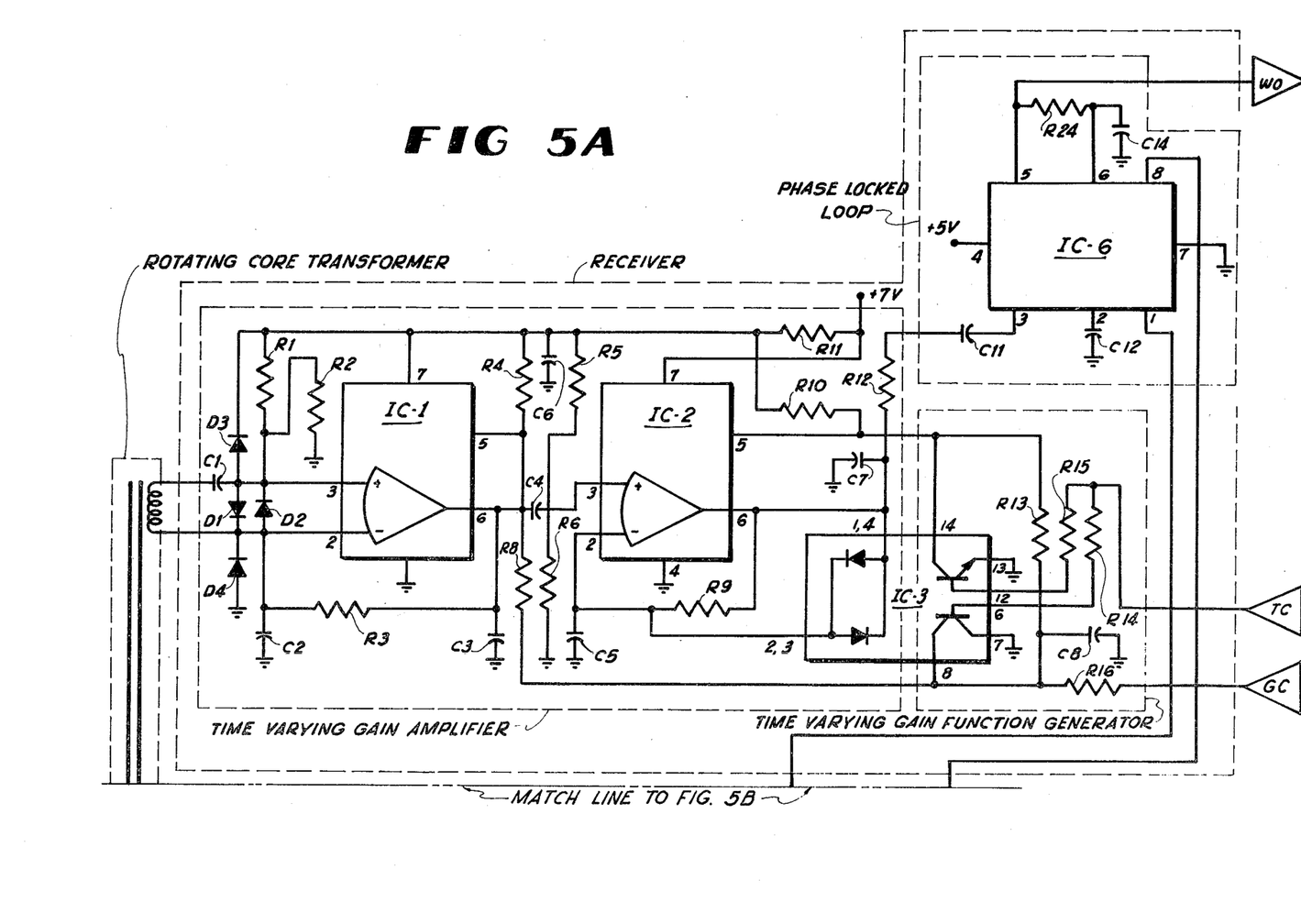
FIGS. 5A and 5B together form a circuit diagram of the receiver including the phase locked loop, transmitter, position encoder, and analog to digital converter components of the system shown in FIG. 3.
Figure 5B:
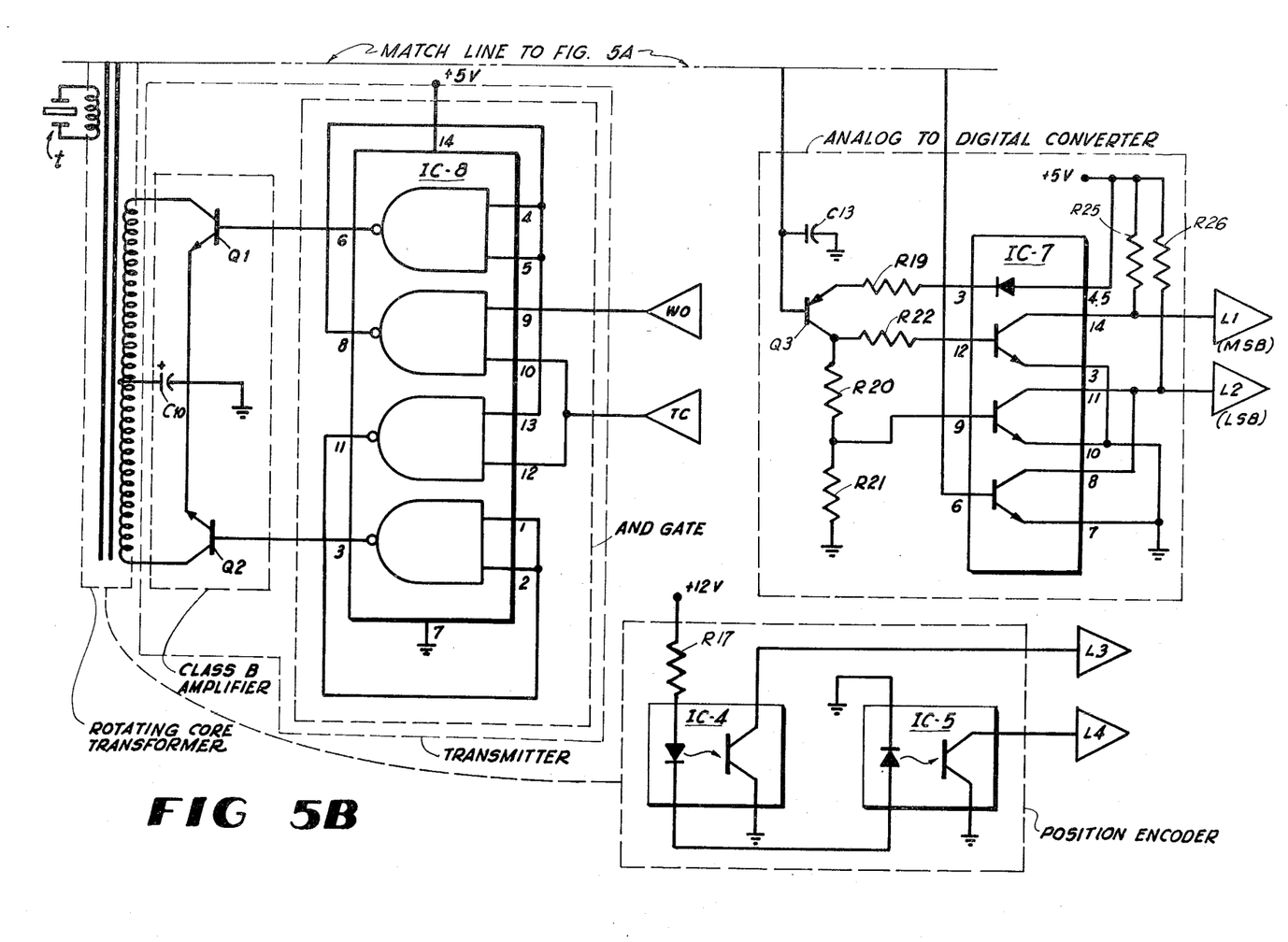

With reference next to FIG. 5B the transmitter is seen to comprise a Class B amplifier driven by a logic AND gate. The inputs of the logic AND gate are connected with the phase lock loop and the transmit command logic, respectively, while the output of the Class B amplifier is connected with the rotating core transformer. The amplifier comprises two transistors Q1 and Q2 having their collectors connected to the transmitting coil of the rotating coil transformer, and their emitters coupled together, to ground, and to the negative side of a capacitor C10 that serves as a local energy storage element for the transmitter. The transistor gates are connected to the AND gate which here comprises an integrated circuit IC-8 that physically is a 7400 type TTL NAND gate. This integrated circuit gates a signal $w_o$ from the phased lock loop with the transmit command signal TC from the transmit command logic.

With reference to FIG. 5A the receiver is seen to comprise a time varying gain amplifier controlled by a time varying gain function generator. The time varying gain function generator is initiated by receipt of a transmit command TC to turn on the common emitter transistors of IC-3. Pin 8 of IC-3 is pulled down to ground from the transmit command at pin 6. Upon completion of the transmit command the transistor is turned off and the voltage across capacitor C8 allowed to rise. The time constant of the exponentially rising waveform is established by the parallel combination of resistors R8, R13, R16 and the capacitor.

The time varying gain amplifier comprises two integrated circuits IC-1 and IC-2 which are each operational transconductance amplifiers. As constructed the gain of the receiver is determined by the product of the individual gains of these two integrated circuits. IC-1 is coupled to the receiver coil of the rotating core transformer through a coupling capacitor C1. Diodes D1, D2, D3 and D4 serve to limit the voltage appearing across IC-1 during transmission. Resistors R1 and R2 serve as a voltage divider for biasing IC-1. Resistor R3 and capacitor C2 form a DC feedback loop to stabilize the operating point of this integrated circuit. Capacitor C3 is provided for limiting the high frequency response to the amplifier while capacitor C4 provides a coupling capacitor between IC-1 and IC-2. Resistors R5 and R6 establish the operating point of IC-2 while resistor R9 and capacitor C5 furnish feedback thereto. The two diodes of another integrated circuit IC-3 are provided to limit the output swing of IC-2. Capacitor C7 and resistor R12 constitute another frequency cutoff filter. Resistor R11 and capacitor C6 decouple a 7 volt power supply for IC-1.

With continued reference to FIG. 5A the phase lock loop is seen to comprise an integrated circuit IC-6, the operating frequency of which is established by the magnitude of a resistor R24 and a capacitor C14. The low pass filter of the loop is established by a capacitor C12 the value of which determines the phase capture characteristics of the loop. A DC output from the phase lock loop indicating that a signal of the appropriate frequency is present in the input is made available at both pins 8 and 1 of the loop integrated circuit.

The analog to digital converter is constructed to provide a two bit Gray code for enhanced system target discrimination providing four discrete levels of target echo returns from zero to maximum echo strength. In accomplishing this the output from pin 8 of IC-6 in the phase locked loop provides a digital signal input to pin 6 of IC-7 in the analog to digital converter that is used as the least significant bit of the converter. A linear signal is fed into the converter from pin 1 of IC-6 which indicates the amplitude of the input signal to the transmitter. This analog signal is converted by a discrete transistor Q3 and the three transistors of IC-7 to the remainder of the data code. With no input signal present the least significant bit (LSB) is emitted by the converter as a high and the most significant bit (MSB) as a low to the memory. The next higher significant level results when the output from pin 8 of IC-6 goes low and hence that of pin 8 of IC-7 goes high. As the most significant bit is still high, the second level of echo strength is provided by a high on both the least significant bit and on the most significant bit. As the input signal is increased the voltage on pin 1 of IC-6 falls causing transistor Q3 to turn on. This results in a rising of voltage at pin 12 and a falling voltage at pin 14 of IC-7. Thus, the next detected level results in a falling of the most significant bit. As the input signal continues to increase pin 1 of IC-6 falls further causing transistor Q3 to turn on more. This causes pin 9 of IC-7 to rise sufficiently so that the least significant bit is again pulled down. Thus, the fourth or highest level is presented by a low on both the least significant and most significant bit. The nonlinear mapping of the converter is set by the ratio of resistors R20 and R21 and values of resistors R19 and R22.

The position encoder is mounted closely adjacent a disc rigidly mounted to the rotatable piezoelectric transducer element as shown in FIG. 4. The circular periphery of the disc is provided with a set of teeth of the same tooth depth save for one which is deeper than the rest. As seen in FIG. 5B the encoder includes integrated circuits IC-4 and IC-5 each of which includes a light emitting diode and photoelectrically gated transistor. IC-5 serves as the count line and IC-4 the reset line. The count line L4 is activated 64 times each revolution of the transducer element where the disc includes 64 teeth, while the reset line L3 is activated but once per revolution. This is accomplished by positioning the LED of IC-5 radially out from the LED of IC-4 whereby the light beams from the LED of IC-4 only strike the transistor of IC-4 when the deep tooth of the disc is aligned therebetween.

Figure 8:
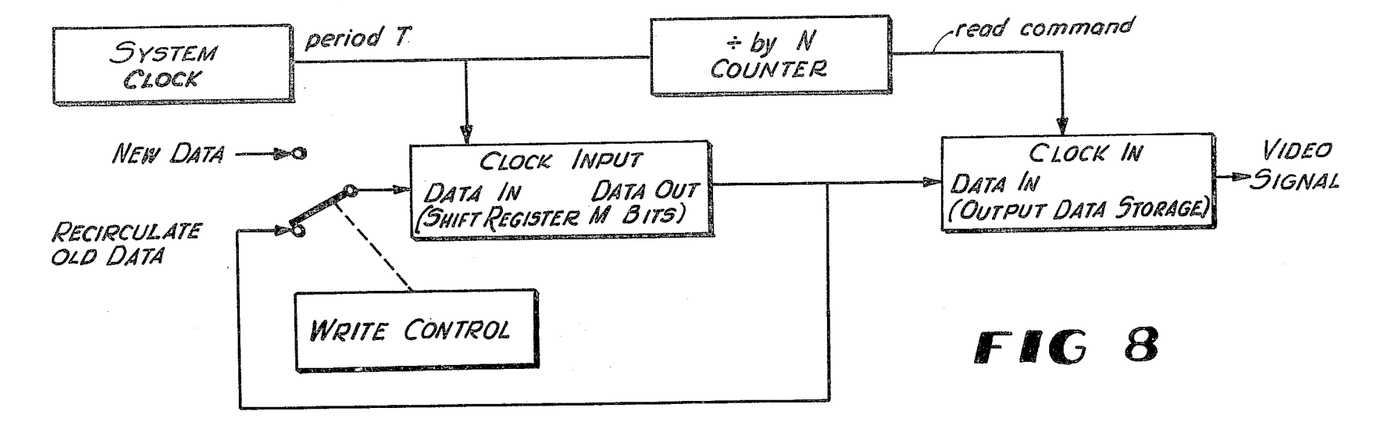
FIGS. 8 and 9 are block diagrams of the memory component of the system shown in FIG. 3 with FIG. 8 being of the serial access type and FIG. 9 of the random access type.
Figure 9:
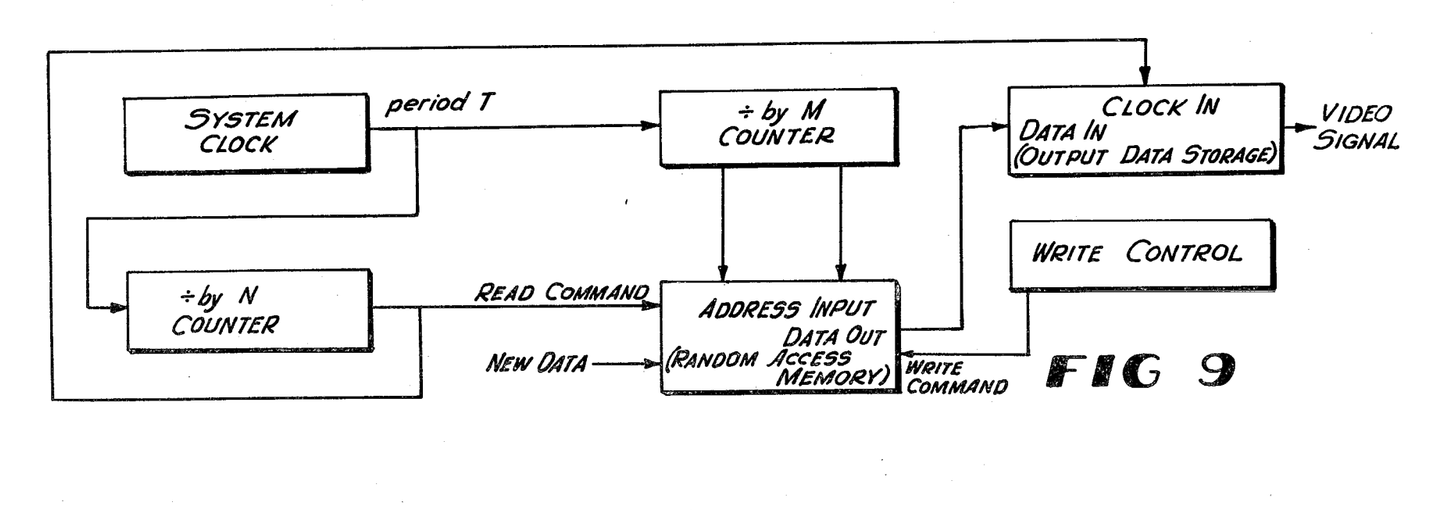

An exemplary set of values for the discrete components in the just described circuits shown in FIGS. 5A and 5B is as follows:

R1—47K ohms
R2—47K ohms
R3—47K ohms
R4—1M ohms
R5—47K ohms
R6—47K ohms
R8—47K ohms
R9—47K ohms
R10—100K ohms
R11—4.7K ohms
R12—1K ohms
R13—47K ohms
R14—4.7K ohms
R15—4.7K ohms
R16—27K ohms
R17—330 ohms
R19—100 ohms
R20—470 ohms
R21—470 ohms
R22—4.7K ohms
R24—3K ohms
R25—4.7K ohms
R26—4.7K ohms
C1—100 pica Farads
C2—1500 pica Farads
C3—33 pica Farads
C4—100 pica Farads
C5—1500 pica Farads
C6—3.3 micro Farads
C7—15 pica Farads
C8—3.3 micro Farads
C10—1000 micro Farads
C11—100 pica Farads
C12—3900 pica Farads
C13—0.02 micro Farads
C14—1500 pica Farads
D1—IN914
D2—IN914
D3—IN914
D4—IN914
Q1—TIP 110
Q2—TIP 110
Q3—2N4143
IC-1—CA3080
IC-2—CA3080
IC-3—CA3086
IC-6—567 LM567
IC-7—CA3086
IC-8—7400 TTL The digital memory may be either of the serial access type or of the random access type. The serial access types, such as those employing shift registers, permit accessing specific addresses at desired rates relative to the system clock period T while random access types permit economical address generation. The block diagram of FIG. 8 illustrates system use of the former while that of FIG. 9 illustrates the latter. However, regardless of what type memory is used it preferably should be capable of accepting new data at a rate substantially slower than the rate at which it makes data available for display such as to a conventional output data storage unit for a CRT. This is necessary in order to continuously provide the cathode ray tube with full picture information while the transducer is transmitting and receiving relatively slow speed sound waves and as it itself slowly rotates. In this manner data being simultaneously displayed on the CRT represents that which has, of course, been gathered at slightly diferent times, and to this extent is variably out of date. Nevertheless, the advantages such offers in continuously presenting a full visual picture of the area under surveillance more than offsets this.

The scheme by which the memory is made to accept new data at a slower rate than it recalls data is as follows. Addresses are generated by counting the system clock down by an integer N where if M is the number of unique addresses in the memory, neither M nor N is unity or divisible evenly in whole numbers into the other. With a serial memory the shift register or registers is clocked by the system clock, and the output of the divide by N counter determines when to sample or read out data from the shift register output. With the random access memory the address counter is driven by the system clock and the output of the divide by N counter determines when to read data out of the memory, that is to say when to institute a read command.

Figure 6:
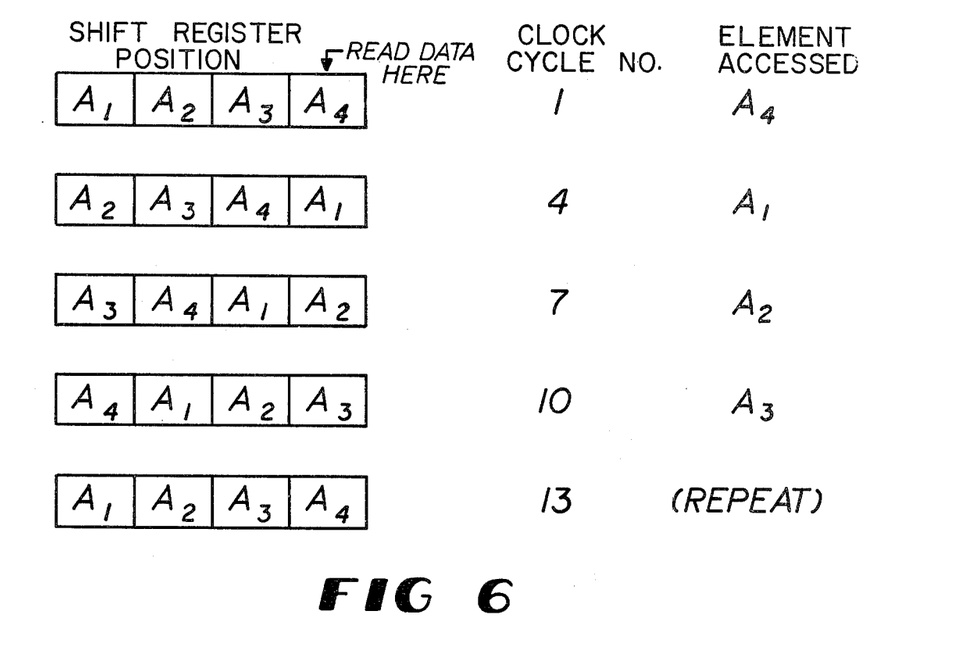
FIGS. 6 and 7 are tables exemplifying operative principles of the memory component of the system shown in FIG. 3.
Figure 7:
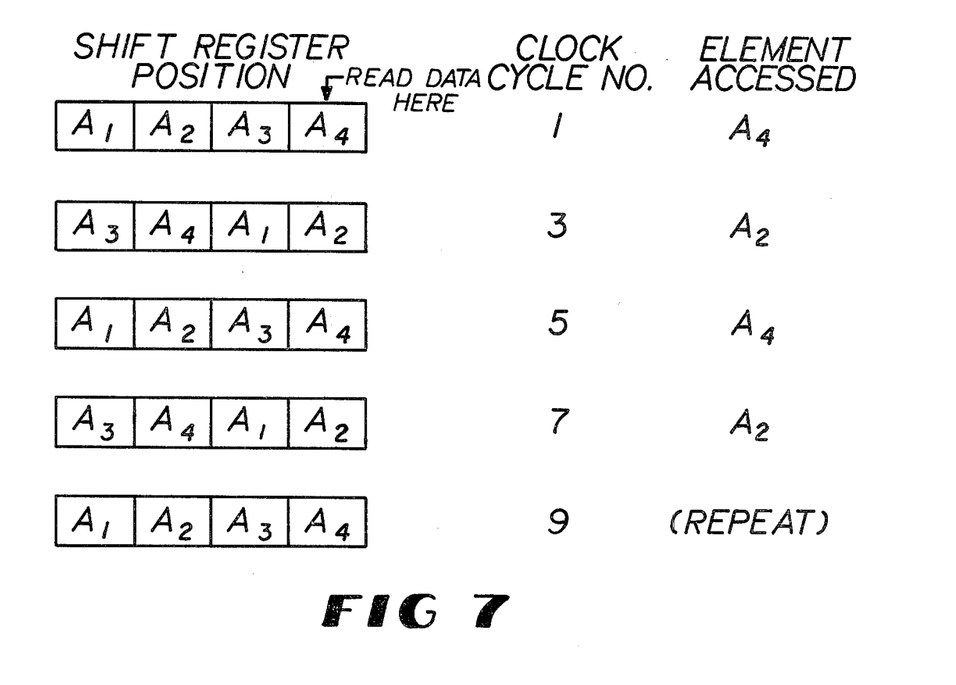

The unique scheme just described can be easily visualized by reference to FIGS. 6 and 7. These figures oversimplify, for purposes of explanation, the situation where a 4-bit shift register is employed having addresses A, $A_2$, $A_3$ and $A_4$. In FIG. 6 thus M is 4 and N is selected as 3 whereby the above criteria of neither M nor N being unity or evenly divisible one into the other is met. With this selection address $A_4$ is read on clock cycle member 1, $A_1$ on clock cycle number 4, $A_2$ on cycle number 7, $A_3$ on clock cycle number 10 and $A_4$ again read on clock cycle number 13 in recommencing the sequence. In comparison with this assume M were again 4 but that N were selected as 2. In this event, as shown in FIG. 7, addresses $A_1$ and $A_3$ would fail to be read. This is because four is evenly divisible by 2. Unity is workable insofar as all addresses are read, but it fails to provide by the differential in new data input speed to the memory and data output. Until previously stored data is replaced with new data the old is continuously recirculated in the register and read.

It thus is seen that an improved imaging type sonar system is provided having enhanced image display capacity. The system can use short persistence, high intensity phosphors with their attendant advantages. The system is capable of continuously presenting a complete and substantially current image of an area being scanned with improved target discrimination. The system may employ a fixed elevation angle transducer and not require synchronization between transducer position and CRT sweep. The system may also include long term storage means for recalling previously displayed images.

It should be understood that the specific embodiment just described merely exemplifies principles of the invention in a preferred form. Many modifications may, of course, be made thereto without departure from the spirit and scope of the invention as set forth in the following claims.

What is claimed is:

1. An imaging sonar system comprising:
(A) a transmitter and receiver;
(B) rotatable transducer means coupled with said transmitter and receiver for generating sound waves and for detecting echoes therefrom;
(C) drive means for rotating said rotatable transducer means;
(D) transducer position sensing means for sensing the rotary position of said rotatable transducer means;
(E) analog to digital converter means coupled with said receiver for converting receiver emitted signals into digital form;
(F) digital memory means for storing receiver emitted signals as digital data;
(G) write and read control means for respectively entering digital data into and recalling digital data from said memory means;
(H) a cathode ray tube coupled with said memory means and having beam deflector means synchronized with said memory read control means for displaying data recalled from said memory means as an image of echoes detected by said transducer means; and
(I) transmit command logic means coupled with said memory write control means and with said transducer position sensing means for initiating transmit commands to said transmitter with the memory write control means synchronized with sensed transducer positions.

2. An imaging sonar system in accordance with claim 1 wherein said transmitter comprises an amplifier driven by an AND gate connected with said transmit command logic means, and wherein said receiver comprises a phase locked loop also connected with said transmitter AND gate.

3. An imaging sonar system in accordance with claim 1 wherein said transmitter comprises an amplifier driven by an AND gate connected with said transmit command logic means, and wherein said receiver comprises time varying gain function generator means also coupled with said transmit command logic means.

4. An imaging sonar system in accordance with claim 3 wherein said receiver comprises a phase locked loop connected with said transmitter AND gate.

5. An imaging sonar system in accordance with claim 1 wherein said receiver comprises time varying gain amplifier means for compensating for variations in echo strengths attributable to variations in distances between echo targets and the transducer.

6. An imaging sonar system in accordance with claim 1 wherein said analog to digital converter means includes means for converting received emitted signals into multiple bit digital form whereby digital data on a multiple level grey scale indicative of sensed echo strength may be entered into said digital memory means upon command by said read control means.

7. An imaging sonar system in accordance with claim 6 wherein said analog to digital converter means includes means for converting receiver emitted signals into time continuous multiple bit digital form.

8. An imaging sonar system in accordance with claim 1 wherein said transducer position sensing means includes phototransistor means for generating an electrical signal, means for directing a beam of light onto said phototransistor means, and shutter means mounted to said rotatable transducer means for intermittently interrupting the beam of light.

9. An imaging sonar system in accordance with claim 1 wherein said digital memory means is serial and comprises at least one shift register.

10. An imaging sonar system in accordance with claim 1 wherein said cathode ray tube is monochrome comprising short persistence phosphorous.

11. An imaging sonar system comprising:
(a) a transmitter and receiver;
(b) scanning transducer means coupled with said transmitter and receiver for generating sound waves and for detecting echoes therefrom, said scanning transducer means being positionable for directing the generated sound waves radially in all directions and through an arc along each radius;
(c) analog to digital converter means coupled with said receiver for converting receiver emitted signals into digital form;
(d) serial access memory means for accepting into storage receiver emitted signal data at a predetermined rate and for presenting for recall from storage receiver emitted signal data at a rate different than said predetermined rate;
(e) write and read control means for respectively entering digital data into and recalling digital data from said memory means; and
(f) display means coupled with said scanning transducer means and said memory means and having means synchronized with said memory read control means for displaying data recalled from said memory means as a gray code image of echoes detected by said transducer means.

12. An imaging sonar system in accordance witth claim 11 wherein said serial access memory means includes time continuous converter means for alternatively recirculating old first data stored therein and receiving new second data from said analog to digital converter.

13. An imaging sonar system in accordance with claim 12 wherein said means for alternatively recirculating old data and for receiving new data comprises a switch controlled by said write and read control means.

14. An imaging sonar system in accordance with claim 11 wherein said serial access memory means comprises a first shift register having a first data output terminal coupled with a data input terminal of second shift register having a second data output terminal and a video amplification means coupled through said second data output terminal to said display means.

15. An imaging sonar system in accordance with claim 14 includes a switch controlled by said write and read control means and wherein said first shift register data output terminal is coupled with a data input terminal of said first shift register through said switch.

16. An imaging sonar system in accordance with claim 14 wherein said first shift register had M bit data storage capacity, and wherein said serial access memory means further comprises clock means for entering data into said first shift register at a rate X and for entering data into said second shift register at rate X/N where neither M nor N is unity or evenly divisible into each other, whereby data may be entered into said second shift register from said first shift register at a slower rate than data is entered into said first shift register.

17. A method of forming visual images of submerged scenes comprising the steps of:
generating sound waves radially from a source onto a submerged scene and detecting echoes therefrom;
transforming the detected sound wave echoes into an analog electrical energy signals;
enhancing the analog electrical signal proportional to the distance the echo travels;
digitizing the electrical signals;
entering digital data from the digitized signals into a digital memory at a first rate;
recalling digital data from the memory at a second rate faster than the first rate;
displaying the recalled digital date continuously corresponding to its radial position on a display means, radially from a central position of the tube display means; and
replacing the display with updated data periodically.

18. An imaging method in accordance with claim 17 wherein digital data from the digited signal is entered into a first shift register component of the memory.

19. An imaging method in accordance with claim 18 wherein digital data recalled from the first shift register are entered into a second shift register component of the memory from which it is subsequently recalled for display and data from the first shift register are selectively recirculated through the first shift register.

20. An imaging method in accordance with claim 19 wherein the first shift register has M bit data storage capacity, and wherein digital data is entered thereinto at a rate X and entered into the second shift register at a rate X/N where neither M nor N is unity or evenly divisible into each other.

21. An imaging method according to claim 17 wherein the propagated sound waves and the detection of their echo are swept in a radial path around said source and the display is progressively updated once with each sweep.

22. The method defined in claim 21 wherein the step of updating the display includes displaying the data continuously for one revolution of the sweep and in radial lines about a center and updating the displayed radial line with new date after each sweep.

23. The method defined in claim 22 in which steps take place in a boat and the display is oriented with the boat so as to visually indicate the relative bearing of the echoes.

24. A method of forming a visual image of a submerged scene around a boat comprising the steps of:
(a) generating sound waves into the water as a continuous sweep around the boat;
(b) receiving the echoes from said sound waves;
(c) transforming the received echoes into analog electrical energy signals;
(d) displaying functions of the signal visually;
(e) imparting a gain to said electrical signal proportional to the delay in the return of the echo so that the more distant appears as distinct as the closer echoes when displayed visually; and
(f) periodically updating the functions of the signals as visually displayed so that a continuous display of the reflections of surfaces in the volume of water surrounding the boat is provided.

25. The process defined in claim 24 wherein the promulgating of sound waves is achieved in a sweep around a vertical axis of a signal source of sound waves and wherein the periodic updating is achieved as the sweep takes place so that each radial increment of the display is updated once each revolution.

26. Method of forming visual images of submerged scene comprising the steps of:
(a) generating from a source sound waves radially into water onto a submerged scene so as to contact fish in the water and the bottom surface of the water;
(b) detecting the sound wave echoes at said source;
(c) moving the generation and detection of the sound waves in a circular path about said source;
(d) segregating the sound waves echoes according to their intensity; and
(e) simultaneously displaying visually a representation of the said segregated sound wave echoes so that a representation of the bottom surface around the source is displayed and a representation of the fish is superposed on the display of the bottom surface and the difference in intensity of such representation of the sound wave echoes from the fish is visually brighter than the representation of the sound wave echoes from the bottom surface.

27. The method defined in claim 26 wherein the visual display is radial and oriented with the direction of the echo from the boat.

28. The imaging sonar defined in claim 11 wherein said display means is a cathode ray tube.

29. The method defined in claim 17 wherein said display is a cathode ray tube.

30. The method defined in claim 24 wherein the step of displaying functions of the signal visually includes displaying the same on a cathode ray tube.

31. The method defined in claim 26 wherein the step of displaying visually the representation of the sound wave echoes included displaying the same on a cathode ray tube.

32. Method of forming usable digital electrical signals which are representative of a submerged scene comprising the steps of:
generating sound waves into a body of water from a boat floating therein;
progressively receiving, in successive sweeps around said boat, the echoes of said sound waves;
progressively translating the received echoes into analog electrical energy signals;
converting said analog signals into digital signals;
storing said digital signals;
subsequently retrieving the stored digital signals;
progressively sensing successive angular positions from which the echoes are received; and
controlling the storage of the digital signals and the subsequent retrieval thereof, in response to the sensing of such angular positions.

33. The method defined in claim 32 wherein said signals which is sorted are retrieved at a rate faster than they are stored.

34. The method defined in claim 32 including the step of displaying said retrieved data as a function of the angular position detected when the echo forming the data was received, whereby the displayed data reproduces as a display, the bottom of the body of water around the boat and simultaneously therewith the fish or other submerged bodies in their angular position with respect to the boat.

* * * * *